United States Patent [19]
Smith

[11] 3,772,613
[45] Nov. 13, 1973

[54] BALANCED LINE TYPE PULSER CIRCUIT

[75] Inventor: William Irving Smith, Burlington, N.J.

[73] Assignee: RCA Corporation, New York, N.Y.

[22] Filed: Sept. 11, 1972

[21] Appl. No.: 287,722

[52] U.S. Cl. .................. 332/12, 323/58, 328/65, 328/230, 332/13, 331/94.5 R
[51] Int. Cl. ............................................. H03k 7/00
[58] Field of Search ...................... 332/9 R, 12 B, 7, 332/5, 25; 331/6; 328/64, 65, 66, 230, 232; 323/58

[56] References Cited
UNITED STATES PATENTS

| | | |
|---|---|---|
| 2,579,542 | 12/1951 | Bostick ................................. 332/12 |
| 2,980,859 | 4/1961 | Oliver et al. ..................... 328/230 X |
| 3,274,515 | 9/1966 | Badger............................. 332/13 X |
| 3,524,148 | 8/1970 | Bjorke............................... 332/9 R |

*Primary Examiner*—Alfred L. Brody
*Attorney*—Edward J. Norton et al.

[57] ABSTRACT

A line type pulser circuit wherein a balanced supply source is used to charge a pair of pulse forming networks to equal potentials but opposite polarities via separate current charging circuits. The pulse forming networks are then discharged simultaneously into the primary winding of an output transformer. The secondary winding of the transformer is connected to a load requiring pulses of energy.

9 Claims, 1 Drawing Figure

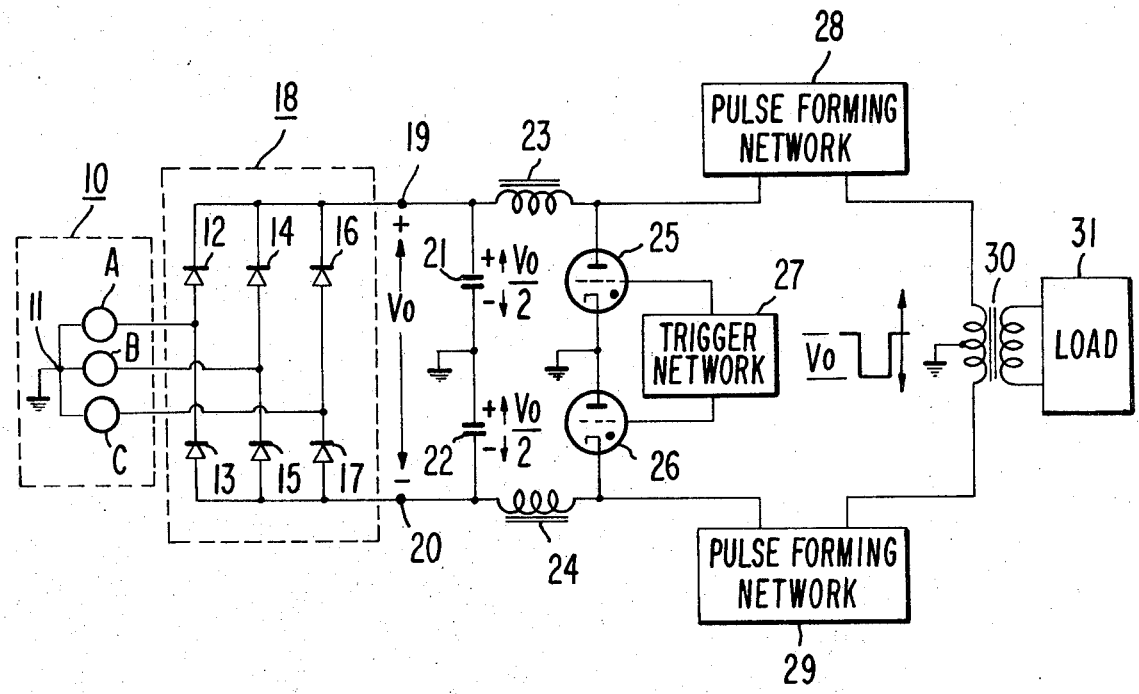

BALANCED LINE TYPE PULSER CIRCUIT

The present invention relates generally to a line type pulser circuit and more particularly to a line type pulser which employs a balanced technique.

There are certain types of pulse generator circuits which are designed for particular types of loads which require pulse energy for the operation thereof. Such loads may be, by way of example, a magnetron tube or a pulse operated laser. Generally, these pulse generators store electrical energy either in an electrostatic field or in a magnetic field. Provision is then made for the discharge of a fraction or all of this stored energy into the load.

There are two basic categories into which most pulser designs for the above-mentioned type loads fall. They are: (a) those in which a small fraction of the stored electrical energy is discharged into the load during a pusle; and (b) those in which all of the stored energy is discharged during each pulse. These two categories are commonly referred to as (a) hard tube pulsers; and (b) line type pulsers. The present invention concerns itself with the type (b) or line type pulser.

Prior art line type pulsers generally take a form which includes a DC supply, a single charging inductor, a single pulse forming network and a switch connected across the supply and the charging inductor. A typical prior art arrangement for a line type pulser may be found in U.S. Pat. No. 2,579,542.

One problem with the typical line type pulser is that the generation of a pulse voltage level equal in magnitude to the source voltage level usually requires the voltage with respect to ground at some point in the circuit to exceed the magnitude of the source voltate. In airborne applications it is especially desirable to keep voltage levels down due to the potential arcing problems as a result of circuit operation at reduced atmospheric pressures.

The present invention provides a line type pulser wherein the pulse level generated is substantially equal to the source voltage level without requiring the voltage at any point in the circuit to exceed the magnitude of the supply voltage with respect to ground. An additional advantage provided by the present invention is that the holdoff voltage requirement of the switching means is half that required for the conventional line type pulser.

In accordance with the present invention there is provided a line type pulser circuit having first, second and third terminals respectively adapted for connection to suitable source of a positive potential, a negative potential and a reference potential. There is also provided a first and second voltage charging means connected between the first and second terminals with an intermediate point therebetween connected to the point of reference potential. A first and a second current charging means are respectively connected in circuit with the first and second terminals. A first and a second pulse forming network are respectively connected in circuit with the first and second current charging means. In addition, a transformer is provided with the ends of the primary winding thereof connected to the first and second pulse forming networks with an intermediate point on the primary winding being connected to the point of reference potential. Means are provided for connecting a utilization device to the secondary winding. Finally, a switching means is connected to form a series path including the pulse forming networks and the primary winding of the transformer. The switching means is selectively operable for providing a low impedance in the path at predetermined times.

The sole FIGURE in the drawing is a partial block and partial schematic diagram of a preferred embodiment of a line type pulser utilizing the present invention.

Referring now to the sole Figure, there is provided a three phase AC supply 10 having phases A, B and C and a neutral point 11 at a reference potential, namely ground. In a typical airborne application, each of the phases A, B and C provided by supply 10 have a frequency of 1200 Hertz and differ in phase by 120° from each other.

Diodes 12–17 are provided in the form of a three phase full-wave bridge circuit 18. Phase A is applied at a point between the anode of diode 12 and the cathode of diode 13. Phase B is applied at a point between the anode of diode 14 and the cathode of diode 15. Phase C is applied at a point between the anode of diode 16 and the cathode of diode 17.

One output terminal 19 of the bridge circuit 18 provides a positive voltage lever whereas the output terminal 20 of the bridge circuit 18 provides a negative voltage level. The voltage measured between terminals 19 and 20 is designated Vo. Thus far described the combination of the three phase supply 10 and the full wave bridge circuit 18 may be thought of as a balanced DC supply circuit having a positive terminal 19, a negative terminal 20 and a reference terminal 11, or grounded terminal.

Capacitors 21 and 22 are serially connected across terminals 19 and 20. An intermediate point between capacitors 21 and 22 is connected to ground potential. Capacitor 21 charges up to a voltage of Vo/2 with the end nearest terminal 19 having a positive polarity charge. Capacitor 22 charges up to a voltage level of Vo/2 with the end nearest terminal 20 having a negative polarity charge.

One end of a current charging inductor 23 is connected to terminal 19 and one end of a second current charging inductor 24 is connected to terminal 20. Inductors 23 and 24 provide surge current limiting for the circuit.

The other end of inductor 23 is connected to the anode of a gas discharge thyratron tube 25. The cathode electrode of tube 25 is connected to ground potential and to the anode electrode of a second gas discharge thyratron tube 26. The cathode electrode of tube 26 is connected to the other end of inductor 24. A trigger network 27 is provided for simultaneously switching on tubes 25 and 26 by the simultaneous application of gating signals to the respective grid electrodes of tubes 25 and 26. Thyratron tubes are customarily used in the present type of application, however, it is evident that other switching devices such as silicon controlled rectifiers may be used in place of the tubes if desired.

A first pulse forming network 28 is connected on one end to the anode of tube 25 and a second pulse forming network 29 is connected on one end to the cathode of tube 26. Pulse forming networks 28 and 29 serve as energy storage devices in the circuit and take the form of lumped-constant transmission lines as is known in the art. Since networks 28 and 29 serve not only as the source of electrical energy during the pulse generation time but also serve as pulse shapers, networks such as 28 and 29 are commonly known as pulse forming networks or PEN's.

The other end of network 28 is connected to one end of the primary winding of transformer 30 while the other end of network 29 is connected to the other end of the primary winding of transformer 30. The primary winding of transformer 30 also has an intermediate point or tap connected to ground potential. A load device 31, such as a magnetron or pulsed laser is connected in circuit with the secondary winding of transformer 30. The turns ratio for transformer 30 is designed for the appropriate transformation of energy from the primary winding of transformer 30 to the level of the impedance represented by load 31.

In operation, elements 10 and 18 in combination with capacitors 21 and 22 present equal magnitude and opposite polarity voltages of $Vo/2$ to the input terminals of charging inductors 23 and 24. Pulse forming network 28 is charged to $+Vo$ via charging inductor 23 and pulse forming network 29 is charged to $-Vo$ via charging inductor 24. Thyratron switches 25 and 26 are then triggered simultaneously from the trigger network 27. The triggering signals cause switches 25 and 26 to look like a low impedance path to ground and thus networks 28 and 29 discharge their stored energy in series relationship through the transformer 30. The discharge of energy from networks 28 and 29 causes a pulse of voltage of magnitude $Vo$ to appear across the primary winding of transformer 30. Transformer 30 then transforms the energy so discharged to the level required for the impedance of the load 31.

From the foregoing, it is evident that pulse forming network 28 charges, via resonant charging inductor 23 and the ground return via one half of the primary winding of transformer 30, to a voltage level of $Vo$. Since the anode electrode of tube 25 is connected between inductor 23 and network 28 and the cathode thereof is connected to ground potential, the maximum voltage to be held off by tube 25 is $Vo$, i.e. the balanced line type pulser output voltage level. Due to the symmetrical arrangement of the circuit, thyratron tube 26 will also hold off a maximum voltage level of $Vo$.

In cases where a switching device is available which can hold off a voltage of $2Vo$, a single device, such as a tube may be used in place of tubes 25 and 26.

What is claimed is:

1. A line type pulser circuit comprising:
   first, second and third terminals respectively adapted for connection to a source of a positive, a negative and a reference potential;
   first and second voltage charging means connected in the order named between said first and second terminals with an intermediate point therebetween connectable to said point of reference potential;
   first and second current charging means respectively connected in circuit with said first and second terminals;
   first and second pulse forming networks respectively connected in circuit with said first and second current charging means;
   a transformer having a primary winding and a secondary winding, one end of said primary winding being connected to said first pulse forming network, the other end of said primary winding being connected to said second pulse forming network, said primary winding further having an intermediate point thereon connected to said point of reference potential;
   a switching means, having a normally high impedance, connected to form a series path including said first and second pulse forming networks and said primary winding, said switching means being selectively operable for providing a low impedance at predetermined times in said series path; and
   means for connecting a utilization device in circuit with the secondary winding of said transformer.

2. The circuit according to claim 1 wherein said first and second voltage charging means respectively include a first and a second capacitor.

3. The circuit according to claim 2 wherein said first and second current charging means respectively include a first and a second inductor.

4. The circuit according to claim 3 wherein said switching means includes at least one gas discharge tube.

5. The circuit according to claim 3 wherein said switching means includes two gas discharge tubes serially connected to conduct current in the same direction with a point between said two tubes connected to said point of reference potential.

6. A line-type pulser circuit comprising:
   an energy supply source having first, second and third terminals, for providing a positive potential, a negative potential and a point of reference potential at said first, second and third terminals respectively;
   a first capacitive energy storage means connected between said first terminal and said point of reference potential;
   a second capacitive energy storage means connected between said second terminal and said point of reference potential;
   a first inductive energy storage means having one end thereof connected to said first terminal;
   a second inductive energy storage means having one end thereof connected to said second terminal;
   a switching means having a normally high impedance connected between the other ends of said first and second inductive energy storage means, said switching means being selectively operable for providing a low impedance path between said other ends of said first and second inductive energy storage means at predetermined times;
   a first and a second pulse forming network;
   a transformer having a primary and a secondary winding, said primary winding having an intermediate tap connected to said point of reference potential;
   said first and second pulse forming networks and the primary winding of said transformer being connected in circuit with said switching means; and
   means for connecting a utilization device in circuit with the secondary winding of said transformer;
   said utilization device being provided with a pulse of energy having a predetermined magnitude and a pulse width substantially dependent upon the operation of said switching means.

7. The circuit according to claim 5 wherein said switching means includes at least one gas discharge tube.

8. The circuit according to claim 5 wherein said switching means includes two gas discharge tubes serially connected to conduct current in the same direction with a point between said two tubes connected to said point of reference potential.

9. The circuit according to claim 5 wherein said energy supply source includes a three phase source of alternating current including a neutral terminal and a three phase full wave bridge rectifier circuit for providing said positive potential and said negative potential, with said reference potential corresponding to the potential at said neutral terminal.

* * * * *